Nov. 27, 1934.　　E. RIEMENSCHNEIDER ET AL　　1,982,400
METHOD OF FORMING AXLE HOUSINGS FOR MOTOR VEHICLES
Filed Feb. 27, 1932　　5 Sheets-Sheet 1
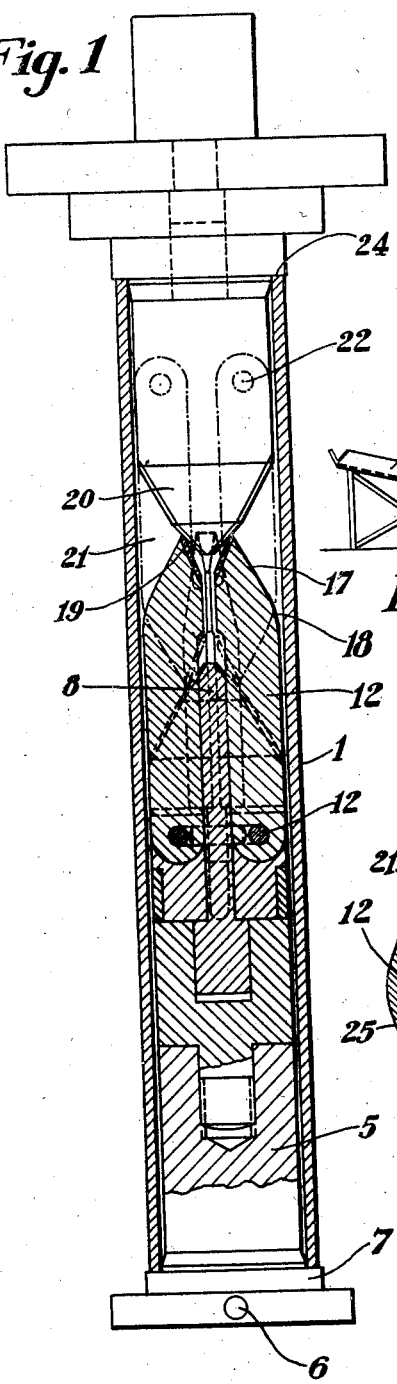
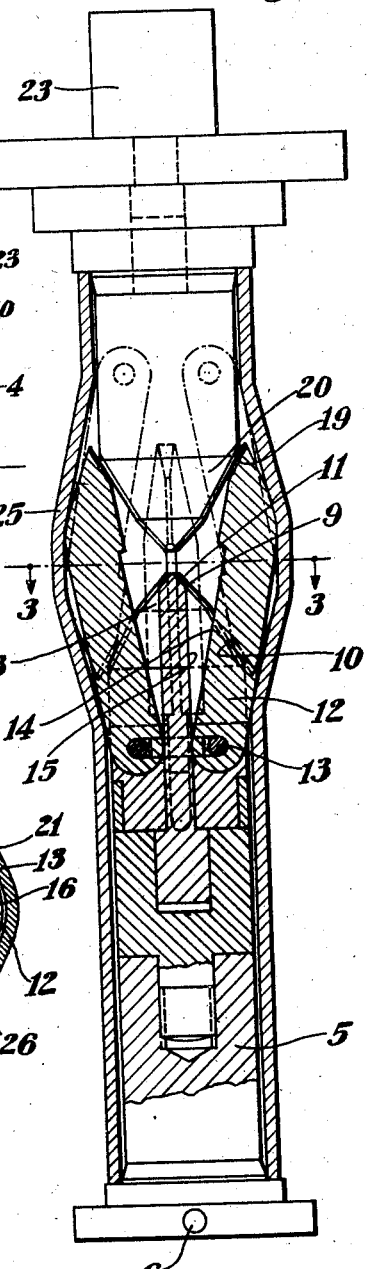
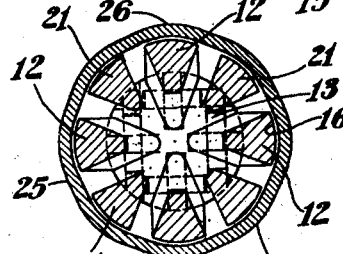
INVENTORS
Ernest Riemenschneider
Rudolph H. Thoms
BY
ATTORNEY

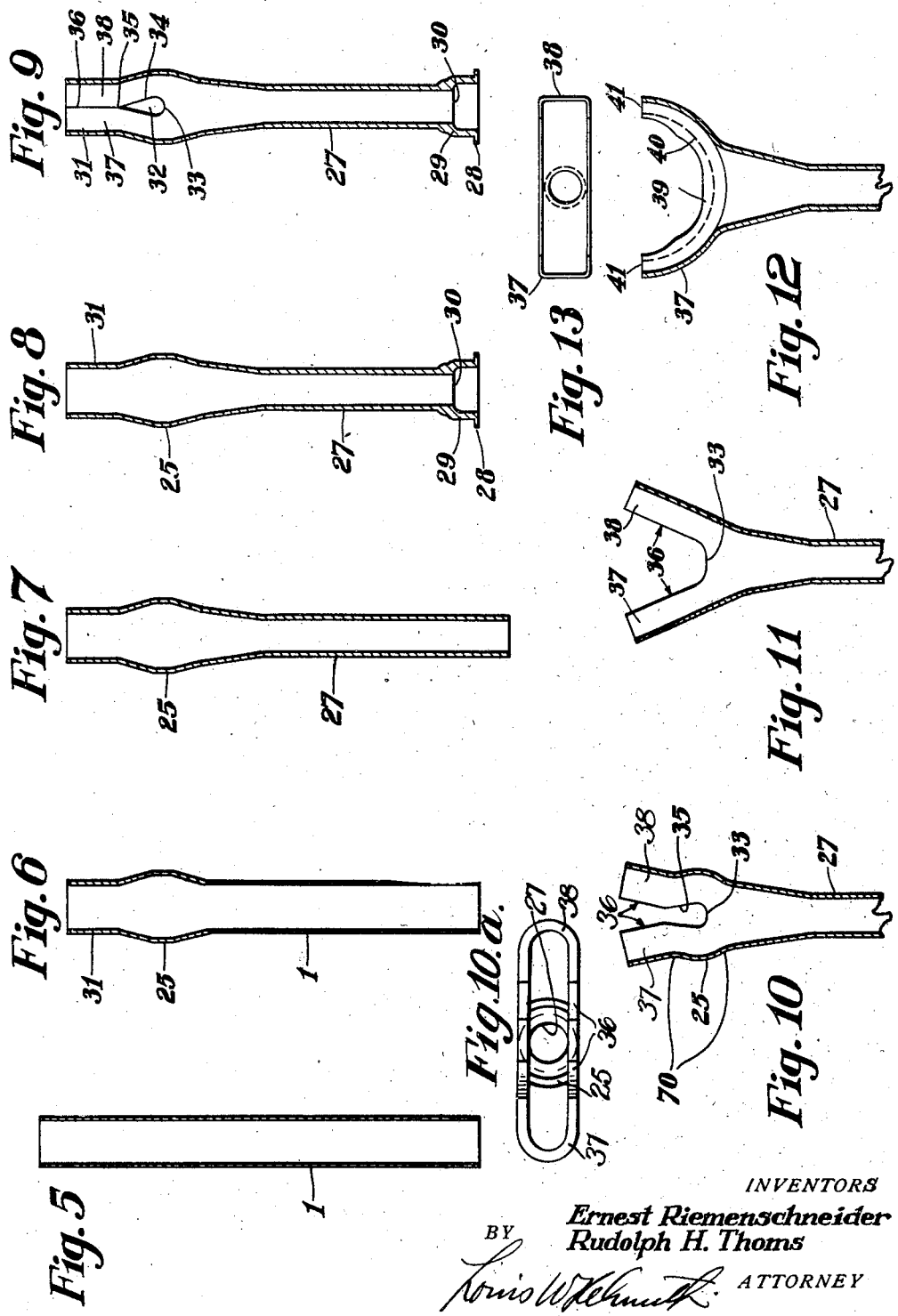

Nov. 27, 1934.  E. RIEMENSCHNEIDER ET AL  1,982,400
METHOD OF FORMING AXLE HOUSINGS FOR MOTOR VEHICLES
Filed Feb. 27, 1932  5 Sheets-Sheet 3

INVENTORS
Ernest Riemenschneider
Rudolph H. Thoms
BY
ATTORNEY

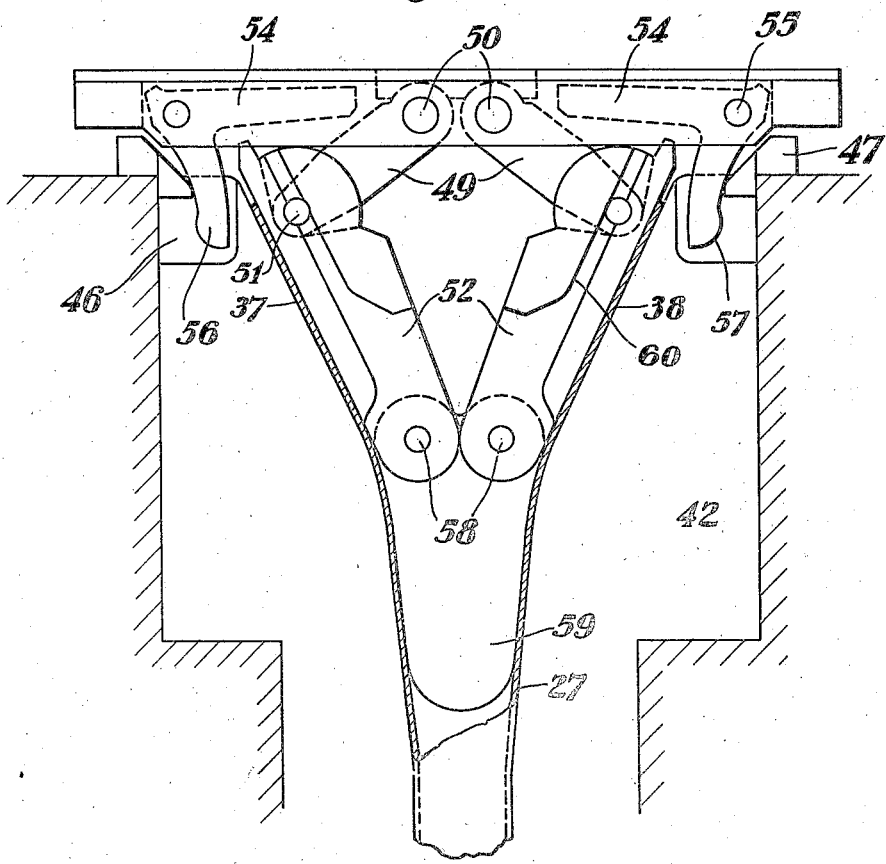

Nov. 27, 1934. E. RIEMENSCHNEIDER ET AL 1,982,400
METHOD OF FORMING AXLE HOUSINGS FOR MOTOR VEHICLES
Filed Feb. 27, 1932  5 Sheets-Sheet 5
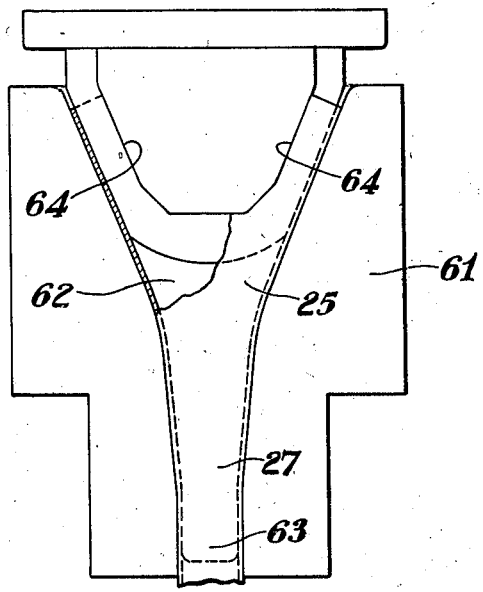
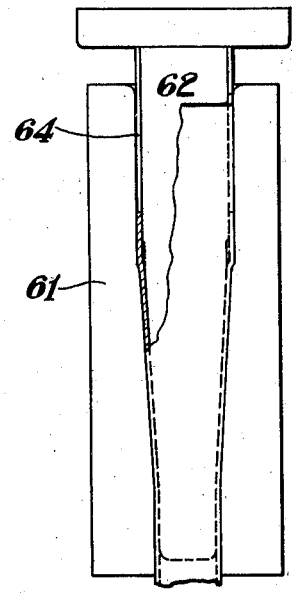
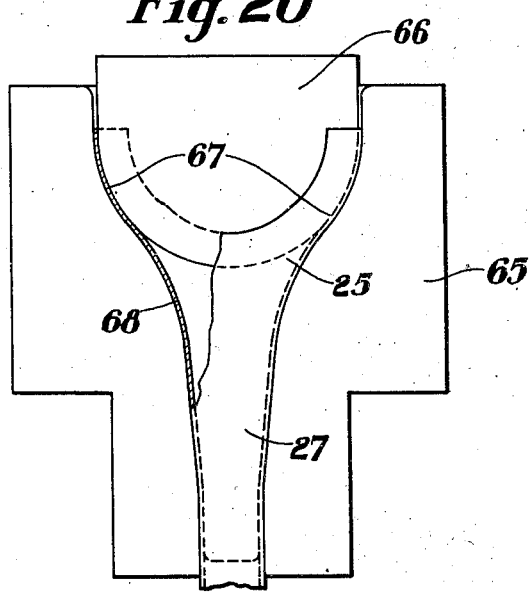
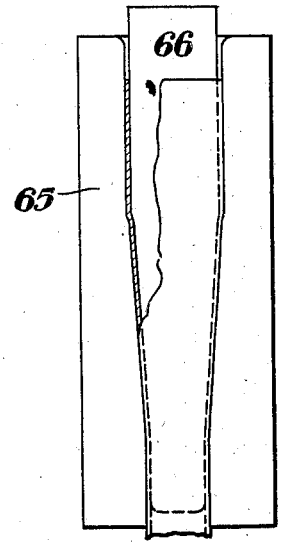
INVENTORS
Ernest Riemenschneider
Rudolph H. Thoms
BY
ATTORNEY Patented Nov. 27, 1934

1,982,400

UNITED STATES PATENT OFFICE 1,982,400

METHOD OF FORMING AXLE HOUSINGS FOR MOTOR VEHICLES

Ernest Riemenschneider and Rudolph H. Thoms, Cleveland, Ohio, assignors to The Midland Steel Products Company, Cleveland, Ohio, a corporation of Ohio Application February 27, 1932, Serial No. 595,532

12 Claims. (Cl. 29—153.1)

This invention relates to new and useful improvements in a method of forming axle housings for motor vehicles.

An important object of the invention is to provide a method of forming axle housings from the minimum amount of stock and in which any stretching or thinning of the stock is caused to occur in the thickened portions to compensate for the thinning, to produce axle housings having wall thickness of requisite dimensions in different portions thereof.

Another important object of the invention is to provide a piece of tubular stock with a particular shape and construction which will accurately form up into an integral banjo portion having substantially uniform wall thickness and without danger of the stock wrinkling during the forming operations.

A further object of the invention is to provide means for increasing the thickness of the tubular stock and at the same time expanding the same whereby the wall thickness of the bulged or expanded portions and the end of the tubular stock adjacent thereto exceeds that of the original stock.

Another important object of the invention resides in the provision of a pair of complementary axially movable dies having interfitting expander fingers adapted to engage the tubular stock at a plurality of points both circumferentially and longitudinally of the stock to expand and thicken a considerable section thereof and provide an enlarged or bulged annulus gradually tapering from its greatest diameter to the tubular stock.

Other objects and advantages of the invention will become apparent during the course of the following description.

In the accompanying drawings forming a part of the description and wherein like numerals are employed to designate like parts of the several views, Fig. 1 is a longitudinal vertical section through the tubular stock and one of the die members, the other member being indicated in elevation and with the dies in semi-retracted position.

Fig. 2 is a similar view illustrating the position of the parts when the dies are in fully expanded positions.

Fig. 3 is a transverse section of the same taken on the line 3—3 of Fig. 2.

Fig. 4 is a miniature side elevation of the dies shown associated with the stock feeding arrangement.

Fig. 5 is a longitudinal section of the tubular stock employed in the production of axle housings.

Fig. 6 is a similar view showing a portion of the tubular stock after being operated upon by the apparatus illustrated in the preceding figures.

Fig. 7 is a similar view after the drawing operation.

Fig. 8 is a similar section after the swaging, upsetting and flanging operation.

Fig. 9 is a similar section of the stock after the perforating and slitting operation.

Fig. 10 is a similar section of the banjo end of the stock after the flattening and straightening operations.

Fig. 10a is an end elevation of the slit tube partially flattened.

Fig. 11 is a similar section illustrating the relative positions of the arms of the bifurcated end after a forming operation.

Fig. 12 is a similar section showing the fully expanded and formed end of the banjo portion of an axle housing, the dotted line illustrating the portion which is removed as trimming and which has withstood any thinning of the stock which has occurred during the expanding and forming operations.

Fig. 13 is an end elevation of the same.

Fig. 17 is a side elevation of the wing die in expanded position.

Fig. 18 is a side elevation of a modified form of rigid expander die.

Fig. 19 is an end elevation of the same.

Fig. 20 is a side elevation of a final forming die.

Fig. 21 is an end elevation of the same.

Figure 14:
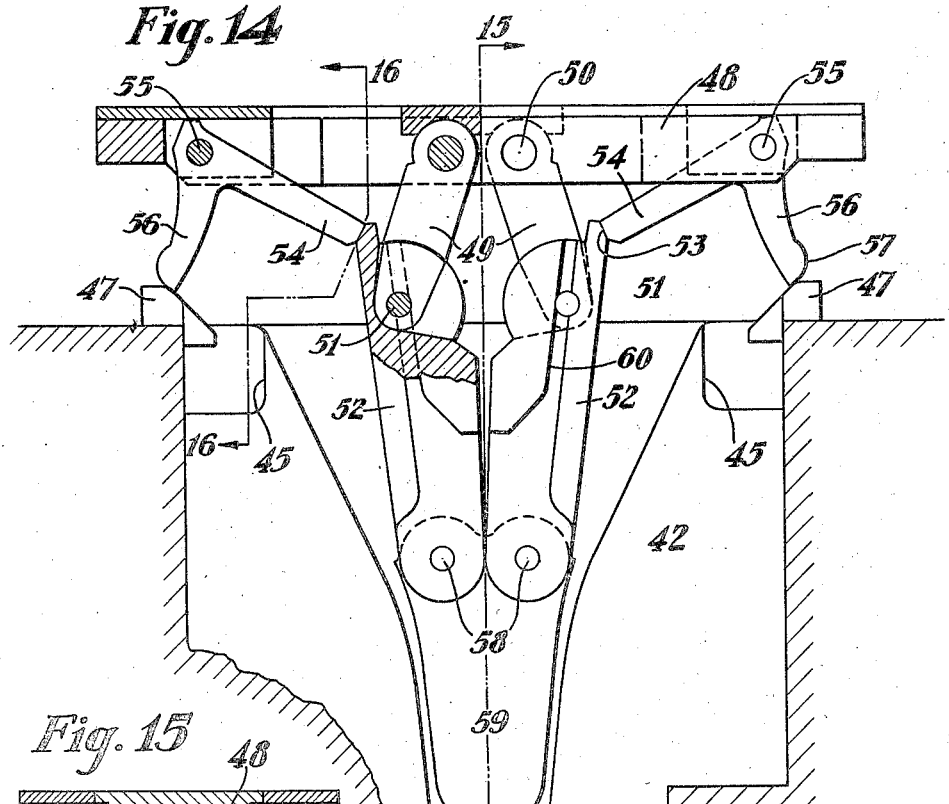
Fig. 14 is a side elevation of a wing die with parts broken away.

Referring now in detail to the drawings and for the purpose of illustrating one practical use of the apparatus and method, the treatment of stock for the formation of axle housings will be described, but it is to be understood that the apparatus and method herein disclosed is not to be limited in any respect to the precise article formed by the apparatus. Tubular welded or seamless stock of uniform diameter throughout is preferably used for the herein described method and is preferably stock having a wall thickness of $\frac{3}{16}$ of an inch and a diameter of approximately 3¾ inches which is approximately two inches less in diameter than that heretofore found necessary for the production of axle housings. This tubular stock is designated by the numeral 1 and has a uniform wall thickness throughout its entire length. The end of the tube to be thickened and expanded is preferably, but not necessarily heated to a proper forming heat. It is then slid down an inclined V-shaped trough 2 from an oven with its cool end leading downwardly to a second inclined trough 3, above which the lower die member 4 is disposed in the inclined relationship shown in dotted lines in Fig. 4 in a position whereby the stock may be slid over the same with the hot end of the stock projecting beyond the upper end of the member 4 as shown in Fig. 1. The cylindrical body of the lower die is pivotally supported as at 6 on a horizontal axis so that it may be swung from the upright position shown in full lines in Fig. 4 to the inclined dotted line position for the reception of the tubular stock which is slid down the troughs 2 and 3. The die member may be pivotally supported in any suitable manner whereby it is absolutely stable in its upright position. Near the lower end of this pivoted die, the body is provided with an annular shoulder 7 for engagement with the lower cool end of the tubular stock.

The upper end 8 of this lower die terminates in a substantially tapered or conical nose having two degrees of taper 9 and 10 surfaced with stellite or any other suitable wear resisting material 11. This double taper of the conical nose causes the expander fingers of the complementary dies to take two different degrees of radial movement during the expanding operation, the first stage starting the fingers outwardly until the second stage takes effect and bears the brunt of the work of guiding the metal of the stock outwardly as it is being thickened under axial compression.

At four equi-distant points circumferentially of the upper end of the lower die member 5, the tapered nose 8 and upper end of the body 5 are provided with longitudinally extending V-shaped grooves or recesses which open out into the periphery of the lower member for the retention of the inner ends of the four expander fingers 12. Pins 13 are extended through the body 5 and inner ends of the expander fingers to pivotally connect the latter to the lower die member. In their normal retracted or collapsed position, the inner longitudinal edges 14 of the fingers abut the bottoms of the grooves or recesses so that the outer surfaces of the fingers conform to the shape of the body 5 and are substantially flush with the exterior surface thereof whereby the tubular stock may be freely slid over the lower die member and fingers. In cross section, the expanded fingers 12 are substantially triangular or sector shape, with their outer longitudinal surfaces 16 curved transversely to conform to the inner periphery of the tubular stock when the fingers are in collapsed position. These outer surfaces of the fingers 12 and outer ends are curved inwardly as at 17 to provide the surfaces with cam like portions 18 adapted for engagement with the inner periphery of the tubular stock when the fingers are moved to expanded position. The forward ends of the fingers are inclined and lined with stellite 19 or other suitable wear resisting material for engagement with a tapered nose 20 provided on the upper die member. This upper die member 20 is of substantially the same construction as the lower die member, especially as concerns its tapered nose portion and its four expander fingers 21 which are pivotally connected to the body of the upper member by means of the pins 22. The four expander fingers 21 of the upper die member are of the same construction as the fingers 12 of the lower member and are arranged so that their free ends will ride between the fingers 12 of the lower die member when the two dies are moved toward each other. In this manner, the fingers of each die member slide between pairs of fingers of the other die member and are simultaneously moved radially outwardly as the upper die member 23 carried by a ram is moved axially into the tube and toward the lower die member. As the upper die member approaches the lower member, the inclined ends of the expander fingers of both members engage the tapered surfaces 9 of the complementary die members and are given a starting radial movement while at the same time the tubular stock is subjected to axial compression by reason of the lower end of the tube engaging the annular shoulder 7 of the lower die and the upper end of the tube engaging an annular shoulder 24 carried by the upper die. As the two die members move toward one another, the inclined portions 19 of all eight fingers ride upon the second inclined surfaces 10 of the conical noses of complementary die members to effect a more gradual outward movement of the fingers to properly guide the metal of the tube to cause a considerable section thereof to be bulged outwardly and formed into an expanded annulus. The degree of expansion and the wall thickness of the expanded annulus and adjacent end of the tube may be controlled and varied within a wide range depending upon the degree to which the stock is heated and the proportionate arrangement between the fingers and the abutments 17 and 24 whereby the axial compression of the tube may be properly co-related to the outward radial movement of the fingers. It will thus be obvious that the thickness of metal in this end of the tube is controlled to the desired degree while the metal is being guided by the fingers outwardly to form a bulged annulus having a diameter in considerable excess of the original tube. Due to the radial movement of these eight fingers and their consequent wider spacing the farther out they go in the expanding movement, the bulged or expanded portion of the tube is formed to the cross section shown in Fig. 3 with the slight substantially elliptical shaped bulges or humps 26 formed by the cam portions 18 of the fingers contacting with the inside of the tube and these bulges are spaced both circumferentially and longitudinally of the tube due to the fact that the cams of the expander fingers of the two die members engage the tube at spaced points longitudinally thereof as more clearly seen in Fig. 2. In actual practice, the metal in the crests of the bulges 26 may be rather thinned out while the metal in the valleys thereof is thickened. As these undulations are slight they are smoothed out in and brought to uniform thickness in subsequent forming operations.

As the plunger of the ram moves outwardly or away from the die member 5, the upper die member with its fingers 21 is moved outwardly from the expanded upset end of the tube, it being appreciated that the cam surfaces 18 of the fingers 21 ride upon the inclined walls on the expanded tube and are thereby moved inwardly to their normal position so as to be freely withdrawn from the upper end of the tube. By reason of the tapered nose 20 of the upper die member moving away from the free ends of the fingers 12 of the lower member, these fingers are free to move radially inwardly, whereby the tube 1 can be freely slipped off of the lower die member. This is accomplished by swinging the lower die member 5 to the dotted lined position shown in Fig. 4 where the tube is withdrawn and another piece of tubular stock is inserted thereon. After positioning the tubular stock on the lower die member, it is swung to the upright position shown in full lines at Fig. 4 in position to receive the upper die member as it descends to carry out the expanding operation above described.

The advantages of increasing the wall thickness of the end of the tube in which the expanded annulus or banjo portion is formed, will be more apparent from a consideration of Figs. 5 to 13 inclusive wherein is shown the method of employing this specially formed tube section for the construction of a rear axle housing for motor vehicles. Fig. 5 illustrates a longitudinal section of a welded or seamless tube used in the manufacture of one-half of the entire axle housing. This tube 1 is subjected to the action of the expander heretofore described to produce the expanded annulus 25 having a diameter considerably larger than that of the original tube. Both this annulus and the adjacent end 31 possess a wall greater than the wall thickness of the original tube, due to the axial pressure exerted on the tube by the dies concurrent with the radial outward pressures to expand a portion of the same into the annulus 25, which obviously results in a shortening of the tube as will be clear from a comparison of the lengths of tubes shown in Figs. 5 and 6. The actual variation in wall thickness has not been exaggerated in the illustration, but it is a decidedly important factor.

The next step in the formation of the axle housing section consists of heating the main portion or body 27 of the tube from its other end up to a point in proximity to the expanded annulus 25 for the purpose of drawing and swaging the main body of the tube and thereby reducing its diameter and increasing its length while increasing the wall thickness of this reduced portion as shown in Fig. 7. The reduced diameter end of the tube is then subjected to swaging, forming and flanging dies which enlarge this end of the tube as at 29 while upsetting the same to provide an interior annular shoulder 30 and simultaneously forming the flange 28 on the free end of the tube. This results in the brake apron flange 28, the enlarged end 29 and the reduced portion of the body of the tube being provided with a wall thickness slightly in excess of the thickness of the original stock and at the points where the greatest stresses occur in the axle housing when in use. Of course, the reduction of diameter of the body of the tube or the provision of the flange may be performed prior to the bulging operation, if desired.

In order to produce a section of an axle housing from this product, the expanded annulus 25 at diametrically opposite points, is perforated with sector shaped openings or apertures 32, preferably by cutting out a pair of the bulges 26. The inner semi-circular edges 33 of these openings are disposed approximately at the medial portions of the expanded annulus 25, and do not as might be expected, form the finished edges of the banjo portion of the axle housing, but are subsequently sheared off as will be later described. The side edges 34 of these sector shaped openings converge toward the free end of the tube adjacent the expanded annulus and parallel the walls of the expanded portion until they meet at an apex 35 which is located in the region of the tube where the other end of the expanded annulus begins to merge into the more or less uniform diameter of the tube near the end 31. From these points outward to the free end of the tube, the stock is slit at 36, parallel to the axis of the tube, thereby dividing this end of the tube into a pair of separated arms 37 and 38, whose cross section is substantially semi-circular.

In order to further form the banjo portion of the tube from either of the tubular sections similar in form to that shown in Fig. 9, and to prevent checking of the metal at the arcuate edges 33 of the perforations 32 while holding the alignment of the arms 37 and 38, the entire length of the tube is heated to the necessary forming heat after which this section is laid between dies having complementary die faces to accurately fit the main body of the tube 27 and the flanged end, as well as complementary portions having substantially semi-elliptical configuration with pins projecting therefrom to enter the oppositely disposed perforations 32 of the axle housing section when the two dies are brought together to flatten the outwardly bowed annulus 25 and adjacent split end of the section. As these flattening and straightening dies are brought together upon the axle housing section, they exert pressure upon the same in a plane at right angles to the plane of the slit 36 while during the same operation, the body portion 27 of the tube is subjected to a straightening operation. This flattening operation causes the slit 36 to open and the extremities of the arms 37 and 38 to slightly diverge outwardly to the position shown in Fig. 10. Moreover, this operation maintains the two arms 37 and 38 in alignment and proportions the metal between the same. Moreover, this operation forms this end of the section into substantially elliptical shape in cross section thereby causing the arms 37 and 38 to take on somewhat of a semi-channel shaped cross section which is helpful for guidance of subsequent forming dies to impart a true channel shaped cross section to these arms. It is also believed that the flattening of this end of the section tends to prevent any wrinkling of the metal when it is subjected to other forming dies in order to impart the final shape to the banjo housing portion.

With these axle housing sections possessing the same heat given the same for the flattening operation, they are placed upright on their flanged ends and moved step by step into a forming die where the arms 37 and 38 are spread further apart while imparting to them more or less a true channel shaped cross section. The end of the tube after this forming operation assumes the substantially Y-shaped form shown in Fig. 11 which is produced with the wing die to be presently described. Within the same press are male and female forming dies which impart the final semi-circular configuration to the banjo end of the axle housing shown in Fig. 12, it being noted that the arms 37 and 38 are now formed into true arcuate or semi-circular formation which may have caused further stretching of the metal, particularly in the web regions 39 defined between the inner arcuate edges of the arms and the dotted lines 40. The most severe stretching of the metal occurs in the central part of this webbed portion, but due to the fact that in cases where the wall thickness of the annulus 25 was previously increased by the upsetting and expanding operation, the wall thickness of the finished banjo portion is reduced in this operation to substantially equal that of the original tubular stock. These web portions 39 which have received the stretching are then sheared off along the lines 40 paralleling the semicircular contour of the banjo section. These last two forming operations of the banjo section impart true channel shape cross section to the banjo section as clearly shown in Fig. 13.

Figure 15:
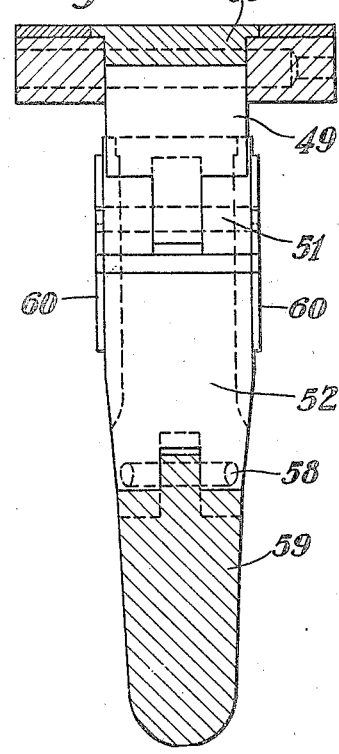
Fig. 15 is a vertical transverse section of the same taken on the line 15—15 of Fig. 14 looking in the direction of the arrows.
Figure 16:
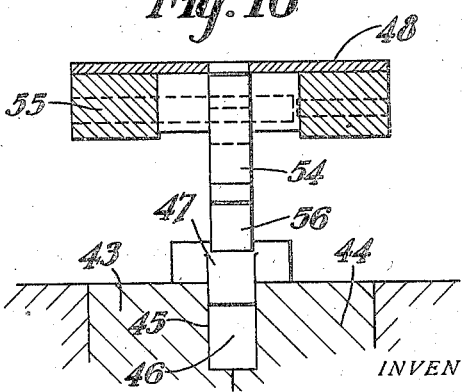
Fig. 16 is a similar section taken on the line 16—16 looking in the direction of the arrows.

The apparatus shown in Figs. 14 to 21 inclusive is for the purpose of operating upon axle housing sections in the shape shown in Fig. 10 and bringing them first to the form shown in Fig. 11 and then to the final form as disclosed in Fig. 12. In order to form the housing section to the shape shown in Fig. 11, it is subjected to the forming die shown in Figs. 14 to 17 inclusive as above described, while this end of the section possesses part of the heat imparted thereto for the flattening and straightening operation. A female die 42 having a configuration to bring the axle housing section to the form shown in Fig. 11 is fitted in the bed of the press and is made in two sections which are automatically separated horizontally to admit axle housing sections of the form shown in Fig. 10 in an upright position, standing on their flanged ends 28. This is better illustrated in Fig. 16 wherein the two sections of the female die 42 are indicated at 43 and 44. The complementary abutting faces of these die sections are provided with complementary recesses 45 forming vertical openings 46 in the die when the two sections thereof are moved into operative position. Outwardly of each opening 46, the bed of the press is provided with trip blocks 47 having inclined faces as illustrated for a purpose which will presently appear.

The male portion of the die which is termed a wing die is suspended from a plate 48 suitably bolted to the movable jaw of the press and is suspended by a pair of links 49, pivotally hung as at 50 from the supporting plate 48 adjacent its center. Pivotally suspended as at 51 from the lower ends of the links 49 are a pair of wings 52, which together with the links 49 form a pair of toggles. The upper ends of these wings 52 outside of the links 49 are provided with shoulders 53 for engagement with the long arms 54 of bell crank trip levers fulcrumed as at 55 to the supporting plate 48 to prevent the toggle joints from breaking outwardly prematurely and when the head of the wing die begins to frictionally engage the tubular portion of the axle housing section. When the long arms 54 of these bell cranks are engaged with the shoulders 53 of the wings, the short arms 56 of the bell cranks, due to gravity, are disposed in outwardly and downwardly diverging relationship shown in Fig. 14 in such position that their cam shaped ends 57 are in a position to engage the bevelled surfaces of the trip blocks 47 when the movable jaw of the press descends to the position shown in Fig. 14.

The lower ends of the wings 52 are pivotally connected as at 58 to the tapered head 59 of the die which is provided at its lower end with a rounded blunt end as illustrated. Opposite sides of each wing 52 are provided with outwardly extending inclined shoulders 60 substantially paralleling the transverse surfaces of the wings in order to engage the edges 36 of the axle housing section and preclude the same from slipping around the wings and turning on the axis of its tubular portion within the female die. After an axle housing section has been inserted into the female die and the latter is closed, the head of the press is caused to descend into the upper end of the axle housing section between the arms 37 and 38 thereof until the head 59 of the male die reaches the position shown in Fig. 14. At this time, the trip levers 57 engage the trip blocks 47, thereby swinging the long arms of the bell cranks upwardly and away from the shoulders 53 of the two wings 52 permitting them to move outwardly on the pivots 58. Simultaneously, the pivots 51 forming the elbows of the toggle joints between the wings 52 and links 49 move outwardly and as the head of the press lowers still further, the outer surfaces of the wings engage the arms 37 and 38 to prevent any wrinkling of the stock at the points 70. As the wing die further descends into the female die, the wings 52 are forcibly engaged with the arms of the axle housing section to force them into the cavities of the female die and press and form the metal to the extent of bringing it uniformly to substantially the wall thickness of the original stock. During this operation, the edges 36 of the arms 37 and 38 engage the shoulders 60 on the wings whereby the arms are prevented from slipping around the sides of the die during the forming operation. The positions of the parts of the wing die when the movable jaw of the press reaches its lowest point, are shown in Fig. 17, it being noted that the links 49 exert considerable pressure on the upper ends of the wings during the final stages of their movement. As the male die reaches its lower position, the long arms of the trip levers move into suitable cavities provided in the supporting plate 48, while the short arms of these levers move downwardly into the openings 46 formed by the complementary recesses 45 in the female die sections. Upon upward movement of the movable jaw, the links 49 will elevate the male die and simultaneously, due to the action of gravity, cause the wings 52 to move inwardly while the trip levers will swing downwardly and automatically engage the shoulders 53 of the wings to retain them in collapsed position. From the foregoing, it will be noted that the wing die, in separating the arms 37 and 38 also irons out the expanded or bulged portions 25, leaving them substantially straight as illustrated in Fig. 11. More specifically, the base of the bulged portion 25 is not further expanded to any appreciable degree during this operation but only the juncture between this bulged portion and the outer ends of the arms 37 and 38 are flattened out without stressing the metal in the crotch between these two arms to any appreciable degree.

In some cases, it is possible to use a rigid die instead of the male wing die for this forming step. This rigid die is shown in Figs. 18 and 19, the numeral 61 designating the two sections of the female die which are separated horizontally as in the preceding modification to admit the axle housing section. The male die is indicated by the numeral 62 and is carried by the movable jaw of the press as in the embodiment just described. The axle housing section is shown positioned between these two dies after the male die has descended into the axle section. In this modification, the lower end or head 63 of the male die extends a considerable distance into the tubular portion of the axle housing section and is adapted to engage the wall of the bulged portion during its descent to pull the metal of the banjo housing portion downwardly to compensate for any thinning tendency due to the spreading action. As in the preceding modification, the male die is provided on opposite sides with shoulders 64 paralleling the outer faces of the die so as to engage the edges 36 of the arms to prevent the same from sliding or slipping around the male die.

After the formation shown in Fig. 11 has been imparted to the axle housing section, it is moved over in alignment with the finishing dies shown in Figs. 20 and 21, positioned in the same press as the wing die, so that upon each operation of the press, one axle housing section is formed as shown in Fig. 11 and another axle housing section is given its final shape shown in Fig. 12. The dies for imparting the final configuration to the banjo housing portion of the axle housing sections are shown in Figs. 20 and 21. They consist of a sectional female die 65 made in a pair of sections similar to the section 42 in order to separate as the movable jaw of the press is elevated to admit a new housing section. The male section of the die is indicated at 66 and is simply a rigid ram formed to an exterior shape forming to the inner surface of the banjo part of a housing section. As the bulged portion 67 of the male die engages the arms 37 and 38 while the latter are still hot, the metal of these arms is further moved out so as to compensate for any thinned portions existing whereby the wall thickness is brought to substantially that of the original stock. As the movable jaw of the press ascends, the sections of the female die automatically separate to permit the successive feeding of axle housing sections to the wing die and final forming dies whereby these two forming operations can be performed under the original heat effected for the flattening and straightening operations heretofore described.

After the formation of two of the axle housing sections shown in Fig. 12, such sections are placed with their channel shaped forks or arms 37 and 38 in longitudinal alignment and in end to end engagement for welding along the lines 41 transversely of the housing to unite the two sections and thereby form a complete axle housing such as disclosed in the co-pending application of Ernest Riemenschneider, Serial No. 481,177, filed September 11, 1930.

By following the steps of this process and using the apparatus herein disclosed, it is possible to construct axle housings from smaller diameter stock than has been possible heretofore, thereby resulting in a tremendous saving of material and substantial reduction in scrap to say nothing of the superior strength of a housing so formed. Heretofore, axle housings which had been formed from tubular stock have necessitated the use of tubing substantially two inches greater in diameter than that which is necessary under the present process. Moreover, axle housing sections heretofore produced under known methods result in a serious thinning out of the stock in the portions receiving the greatest stretch so that weakened portions are produced. By following this process, an axle housing is produced for the first time using the minimum amount of stock and at the same time one which possesses substantially uniform wall thickness up to the region of the brake apron flanges 28 where the wall thickness is increased for the purpose of reinforcing the housing at the points of greatest stress and where the body loads of the vehicle are imposed. It will be obvious from the herein recited process, that at one time or another during the manufacture, the wall thickness of all portions of the section have been altered; but in the finished product, the wall thickness of the entire product except the flanges and ends adjacent thereto, is practically uniform and the same as the original stock.

It is to be understood that various changes in the size, shape and arrangement of parts, as well as the sequence of steps in the process may be made without departing from the scope of the appended claims.

We claim:

1. The method of forming an article consisting of subjecting a portion of the tube to concurrent radial and axial pressures to provide an expanded annulus of greater diameter and wall thickness than the original tube, bifurcating an end of the tube into said annulus, and then spreading the bifurcated portion to the extent of causing the wall thickness thereof to substantially equal that of the original tube.

2. The method of forming an article consisting of forming one end of tubular stock into an enlarged bifurcated end of substantially elliptical cross section, and then forcing a die axially into said section to exert axial and outward pressures upon the arms of the bifurcated portion to impart substantially channel shaped configuration in cross section thereto.

3. The method of forming an article consisting of bulging a portion of a tube adjacent one end while upsetting the same to cause said end and bulged portion to possess portions having wall thickness slightly in excess of that of the original tube, bifurcating said end and bulged portion, and then spreading the bifurcated portion to the extent of causing the wall thickness thereof to substantially equal that of the original tube.

4. The method of forming an article consisting of bulging a portion of a tube adjacent one end while upsetting the same to cause said end and bulged portion to possess a wall thickness slightly in excess of that of the original tube, perforating the bulged portion at diametrically opposite points with sector shaped openings having their converging edges substantially paralleling the contour of the bulged portion, slitting the ends of the tube from the apices of said openings to the free end of the tube to divide said end into a pair of arms constituting part of the bulged portion, and then spreading said arms and forming the same to the extent of causing the wall thickness thereof to substantially equal that of the original tube.

5. The method of forming an article consisting of bulging a portion of a tube adjacent one end while subjecting the same to axial pressure from opposite ends thereby causing the metal of the bulged portion and adjacent end of the housing to increase in thickness, perforating the bulged portion at diametrically opposite points with sector shaped openings having their converging edges substantially paralleling the contour of the bulged portion, slitting the end of the tube from the apices of said openings to the free end of the tube to divide the same into a pair of arms constituting part of the bulged portion, flattening the bulged portion of the tube with pressure exerted parallel to the axis of said openings, and then spreading said arms apart and curving them under pressure to reduce the wall thickness thereof to substantially equal that of the original tube.

6. The method of forming an article consisting of subjecting the tube to axial compression while guiding the metal with mechanical means into a bulged portion, perforating said bulged portion at diametrically opposite points, slitting the ends of the tube from said openings to the free end of the tube, flattening the bulged portion and adjacent end of the tube by pressure exerted normal to the axis of said openings, and then spreading said arms apart and curving them under pressure to the extent of causing the wall thickness of said arms and enlarged portion to substantially equal that of the original tube.

7. The method of forming an article consisting of subjecting a tube to axial compression, positively guiding a portion of the tube radially outwardly at points spaced longitudinally thereof to provide said tube with an extensive bulged portion, said action resulting in imparting increased wall thickness to parts of the bulged portion, perforating said bulged portion at diametrically opposite points, slitting said tube from one end thereof to said openings, and then spreading said arms under pressure and shaping them to the extent of causing the wall thickness thereof to approximately equal that of the original stock.

8. The method of forming an article consisting of providing a tube having a bulged portion adjacent one end thereof, said bulged portion being of greater diameter than said adjacent end, perforating said adjacent end and bulged portion at diametrically opposite points to divide said end and part of the bulged portion into a pair of arms, and then subjecting said tube to an expander die to concentrate force upon the portion of the tube at the juncture of the bulged portion and adjacent end of the tube to prevent wrinkling and thinning of the stock as the arms are being separated and formed.

9. The method of forming an article consisting of providing a piece of tubular stock having a portion thereof adjacent one end enlarged and of substantially elliptical cross section, said enlarged portion and adjacent end of the tube being slit to divide the same into a pair of arms of semi-channel shaped cross section, and subjecting said slit portion to outward pressures directed parallel to the major axis of the elliptical configuration to form said end into a fork having arms of substantially channel shape cross section.

10. The method of forming an article consisting of providing a tube having an enlarged end, bifurcating the enlarged end to divide the same into a pair of semi-channel shaped arms, flattening the enlarged end to form it into substantially oval cross section and then spreading said arms and bending the same into arcuate form and of channel-shaped cross section.

11. The method of forming an article consisting of expanding a portion of a tube adjacent one end while upsetting the same and causing the expanded portion to possess substantially elliptical shaped bulges, perforating the bulged portion at diametrically opposite points to remove portions of said elliptical shaped bulges, slitting the end of the tube from said perforations to the free end of the tube to divide the same into a pair of arms and then spreading said arms and forming the same to the extent of causing the wall thickness thereof to substantially equal that of the original tube.

12. The method of forming an article consisting of forming one end of a tubular section into an enlarged portion of substantially oval cross section, bifurcating said enlarged end to divide it into a pair of arms of substantially arcuate cross section, and then moving a die axially into said section to spread said arms and to force the body portion of said arms into substantially the same plane with the enlarged end while imparting substantially channel-shaped cross section to said arms.

RUDOLPH H. THOMS.
ERNEST RIEMENSCHNEIDER.